Oct. 7, 1969  W. L. RENDESSY  3,471,170
SWAY CONTROL FOR TRAILER HITCH
Filed Oct. 9, 1968  2 Sheets-Sheet 2

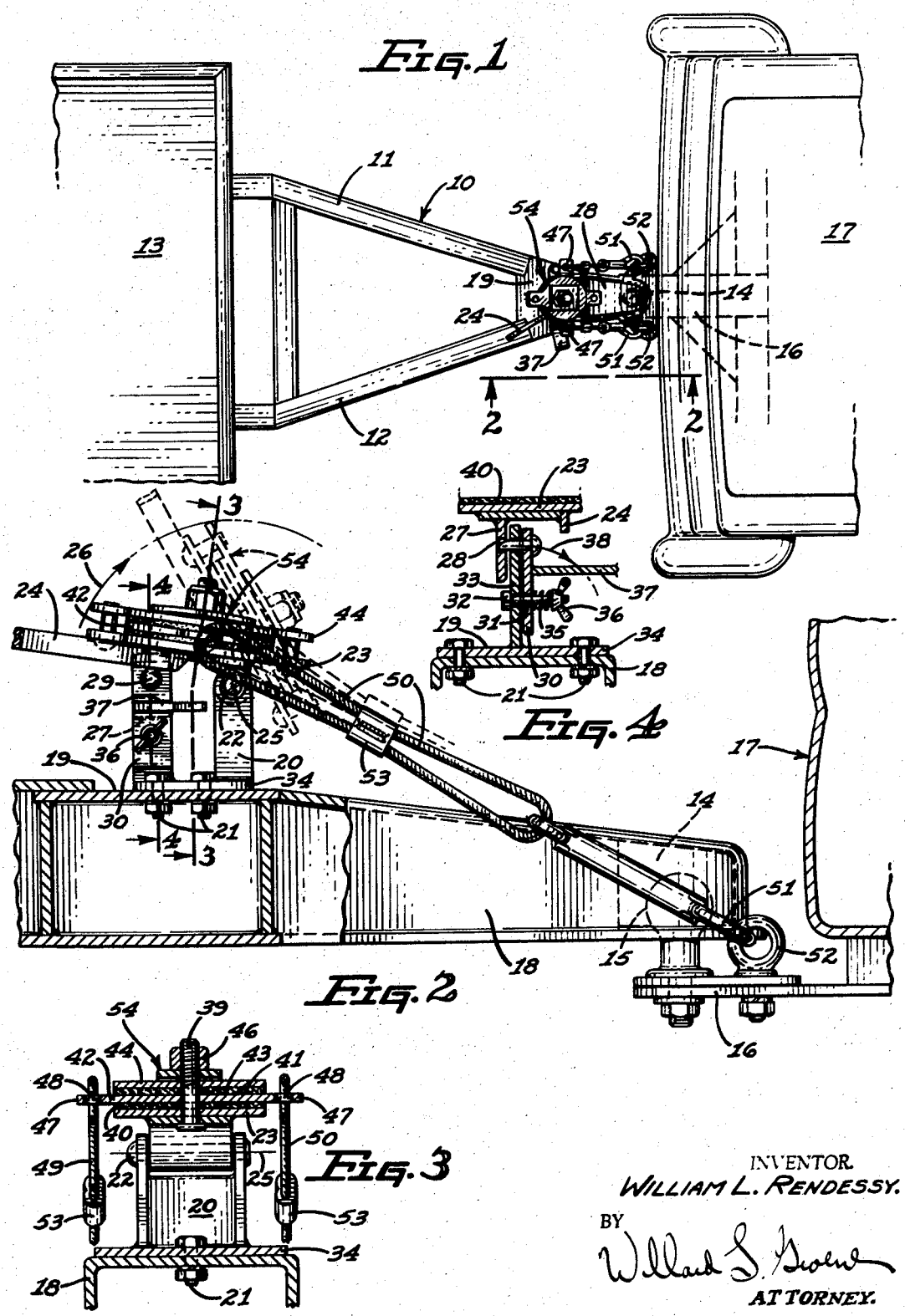

INVENTOR.
WILLIAM L. RENDESSY
BY

United States Patent Office 3,471,170
Patented Oct. 7, 1969

3,471,170
SWAY CONTROL FOR TRAILER HITCH
William L. Rendessy, 1839 E. Moreland,
Phoenix, Ariz. 85006
Continuation-in-part of applications Ser. No. 648,601,
June 26, 1967, and Ser. No. 737,138, June 14,
1968. This application Oct. 9, 1968, Ser. No.
766,212
Int. Cl. G60d 1/16
U.S. Cl. 280—446                                    16 Claims

ABSTRACT OF THE DISCLOSURE

A sway control for trailers adapted to be connected to the trailer and the towing vehicle, and utilizing a friction clutch mechanism for damping tendencies of the trailer to sway relative to the towing vehicle; the damping means being connected to the towing vehicle in a generally parallelogram pivoted structure which provides for frictional damping action and includes parallel linkage in connection with the damping mechanism which also serves as a safety chain mechanism; said parallel linkage also being disposed at an inclined angle from the trailer hitch upwardly and rearwardly to the damping mechanism and acting to operate as a hold down for the portion of the trailer hitch mechanism connected to the tongue of the trailer, said damping mechanism also provided with release mechanism adapted to permit movement of the friction clutch mechanism means forwardly toward the towing vehicle in order to permit simple release of the parallel linkage of the invention relative to connection means with the towing vehicle. Although pivotal movement is preferred, sliding means for release can be used.

Cross-references to related applications

This application is a continuation-in-part of an application of William L. Rendessy, Ser. No. 648,601, filed June 26, 1967, for Sway Control for Trailer Hitch, and now abandoned and a subsequent application for William L. Rendessy, Ser. No. 737,138, filed June 14, 1968, for Trailer Hitch Sway Control Apparatus.

Background of the invention (1) The field of this invention lies in the trailer hitch apparatus for interconnecting vehicles and is particularly directed to a sway control mechanism for use with such trailer hitches.

(2) In the past trailer hitch sway control devices have been difficult to quickly and easily attach between the vehicles without major fitting and adjustments being required.

Further, the efficiency of the damping action and the control has been greatly lacking because of the close proximity of the braking device to the axis of pivoting of the trailer hitch connection between the vehicles, and it has also been difficult to easily and quickly attach or remove the sway control device from between the vehicles particularly when they may possibly be on uneven terrain or road surfaces.

Summary of the invention

The present invention comprises a trailer hitch sway control mechanism having a friction clutch, together with parallel linkage, which interconnects the trailer tongue and rear bar on a towing vehicle. The parallel linkage of the invention serves to cooperate with the friction damping clutch to resist swaying tendencies of the trailer relative to the towing vehicle, and further, the parallel linkage takes the place or is a substitute for the usual safety chain mechanism generally required in connection with trailer hitches, and furthermore, the parallel linkage of the invention which interconnects a bar on the towing vehicle with the damping mechanism on the trailer tongue is disposed at an upwardly and rearwardly inclined angle from an area at the pivotal connection of the trailer hitch to an area rearwardly thereof and in connection with the tongue of the trailer so as to exert a downward force on the trailer tongue and to hold the respective portion of the trailer hitch downwardly in relation to a complemental portion of the trailer hitch which is carried by the towing vehicle. Thus, the invention, in one simple mechanism, serves all three functions, namely, damping, safety chain functions, and trailer tongue hold down mechanism. The invention also comprises a quick release mechanism for pivotally releasing the friction clutch mechanism of the invention to pivot forwardly in order to provide slack in the parallel linkage structure of the invention for quick disconnecting thereof relative to the towing vehicle to which the parallel linkage is connected.

Accordingly, it is an object of the present invention to provide a sway control mechanism for trailers which provides for sway damping action of a trailer relative to a towing vehicle in combination with parallel linkage which also serves as a safety chain substitute, and further, the parallel linkage serves as trailer tongue hold down mechanism.

It is an object of the invention to provide a sway control device for a trailer hitch which is easily installed and interconnected between the vehicles.

Another object of the invention is to provide a trailer hitch sway control device having means for quickly releasing the interconnecting cable means between the towing vehicle and the sway control device with a minimum of effort and skill upon the part of the operator.

A further object of the invention is to provide a sway control between a trailer and a towing vehicle which takes advantage of the maximum swinging movement between the vehicles to provide a more satisfactory and efficient restraint to the swaying motion, but which device may be swung from its normal horizontal operative position to a vertical position to instantly release the interconnecting operating cables of the device for unhooking the trailer from the towing vehicle.

Another object of the invention is to provide a swivel yoke of the invention which operates under central frictional restraint to restain free pivotal movement about a horizontal transverse axis relative to the center line of a trailer hitch pivotal connection; the yoke being mounted on the trailer tongue.

Another object of the invention is to provide a sway control element of the invention which is pivotally mounted to swing about a predetermined axis relative to the pivotal trailer hitch connection.

Another object of the invention is to provide a pair of laterally spaced operating links connected to outer ends of the aforementioned yoke and in near proximity to a center line of said yoke and on a vertical and horizontal plane.

Another object of the invention is to provide a yoke having a vertical center line disposed in near proximity to the center line of a trailer hitch pivotal connection with a towing vehicle.

Another object of the invention is to provide a mounting plate centrally mounted and fixed about the pivotal connection of the trailer hitch.

Another object of the invention is to provide a mounting plate having means to receive forward ends of laterally spaced parallel linkage in a manner so as to position the forward ends of the parallel linkage, when in operation, to operate at pivot points generally disposed on the pivotal center of the trailer hitch connection between the towing vehicle and the respective trailer.

Another object of this invention is to provide a mounting plate, wherein the outer portions are constructed to retain the trailer tongue therein should breakage occur at the trailer ball pivotal connection.

A further object of the invention is to provide a sway control mechanism for trailer hitches, wherein a parallel linkage interconnects a towing vehicle and a trailer tongue, and cooperates with a friction damping clutch, and wherein the parallel linkage of the invention is inclined with respect to the trailer tongue so as to exert a downward force thereon and to maintain a ball socket in connection with the trailer tongue firmly seated on a ball element of a conventional trailer hitch, and thereby maintain hold down force which serves to insure connection safety of the basic trailer hitch mechanism.

Brief description of the drawings

FIG. 1 is a plan view of a sway control device for a trailer hitch incorporating the features of this invention.

FIG. 2 is a fragmentary section view, partly broken away, showing a side elevation of the apparatus on the line 2—2 of FIG. 1.

FIG. 3 is an enlarged fragmentary sectional view on the line 3—3 of FIG. 2.

FIG. 4 is an enlarged fragmentary sectional view on the line 4—4 of FIG. 2.

Description of the preferred embodiments

Figure 5:
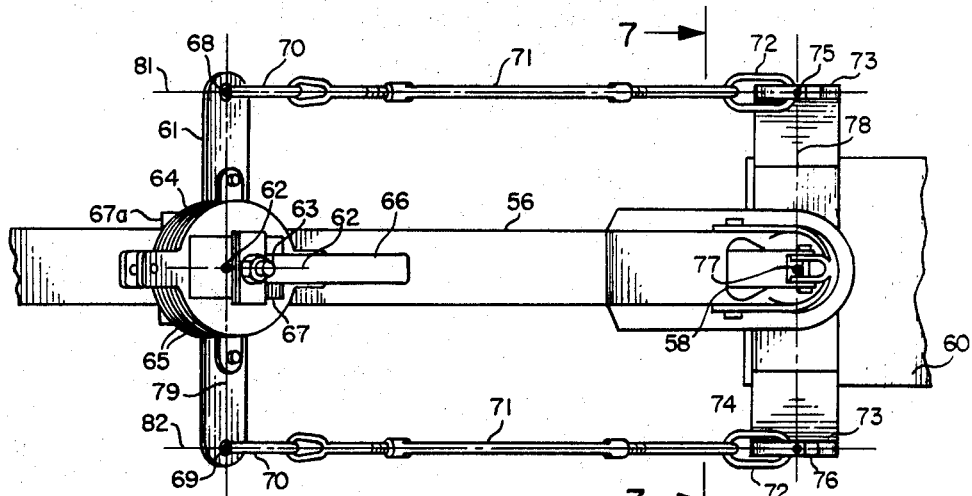
FIG. 5 is a plan view of a modified form of a sway control device for a trailer hitch in accordance with the present invention.

As an example of a preferred embodiment of the invention, there is shown a trailer hitch 10 comprising a frame consisting of the arms 11 and 12 suitably fixed to the trailer 13 and having at their forward ends the usual trailer hitch socket 14 demountable received by the usual trailer hitch ball 15 carried on the hitch bracket 16 suitably attached to the motor vehicle 17 for towing the trailer 13.

Fixed to the forward ends of the arms 11 and 12 is the trailer frame tongue structure 18 carrying the hitch socket 14 rigidly fixed thereto. On the top surface 19 of the trailer frame tongue 18 is fixed a base plate 34 by suitable bolts 21 which supports an integral bracket 20 in the top of which is mounted a pivot pin 22 upon which is pivotally mounted on the lower stationary clutch plate 23 to which is fixed an operating handle 24 for swinging the lower clutch plate 23 about the axis 25 of the pin 22 as indicated by the arrow 26. A latch piece 27 fixed to and depending downwardly from the lower clutch plate 23 has a latch hole 28 arranged to receive the outer end of the latch pin 29 fixed in the trip plate 30 pivotally mounted through a clearance hole 31 on a bolt 32 carried in the bracket 33 fixed to the plate 34 fixed to the housing structure top surface 19 by the bolts 21. A compression spring 35 adjustably regulated by a thumb nut 36 on the bolt 32 so that a foot treadle 37 fixed to the trip plate 30 normally yieldingly swings upwardly, FIG. 4, to insert the latch pin 29 in the latch pin hole 28 to secure the lower clutch plate in normal operative position as shown in full line in FIG. 2. Pushing down on the foot treadle 37, in the direction indicated by the arrow 38, FIG. 4, withdraws the trip pin 29, so that the lower clutch plate 23 may be swung upwardly to the broken line position shown in FIG. 2.

A tension stud 39 is fixed centrally of the lower clutch plate 23 around which is placed the lower clutch disc 40 slidingly engaging the top surface 41 of the lower clutch plate 23. A swivel yoke 42 slidingly engages the top surface of the lower clutch disc 40 and is pivotally journaled on the tension stud 39. On top of the swivel yoke 42 is placed the upper clutch disc 43 on top of which is the upper clutch plate 44, the pressure washer 45 and the adjusting nut 46.

Radially laterally extending integral lugs 47 of the swivel yoke 42 have eyelet openings 48 through which are secured the operating cables 49 and 50, the forward ends of each cable being provided with suitable releasable demountable locking hooks 51 arranged to be connected to eyelets 52 fixed to the frame 16 of the towing vehicle 17. The cables 49 and 50 are adjusted and secured in fixed length by suitable cable clamps 53 so that the cables are under proper tension between the eyelets 52 of the towing vehicle 17 and the eyelets 48 in the yoke 42 when the clutch unit 54 is swung down and latched in full line operative position shown in FIG. 2 by pulling down on the lever 24 to engage the latch piece 29 in the latch pin hole 28, FIG. 4. By tripping the latch by depressing the foot treadle 37 releasing the latch pin 29, the unit flips down to the broken line position, FIG. 2, due to cable tension, which is then released so that the cable front end hooks 51 may be readily released from the eyelets 52 and the hitch 14–15 released in the usual manner. Reversing this procedure is used when hitching up the vehicles.

Figure 7:
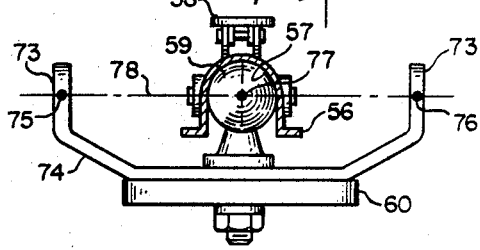
FIG. 7 is a sectional view taken from line 7—7 of FIG. 5.
Figure 6:
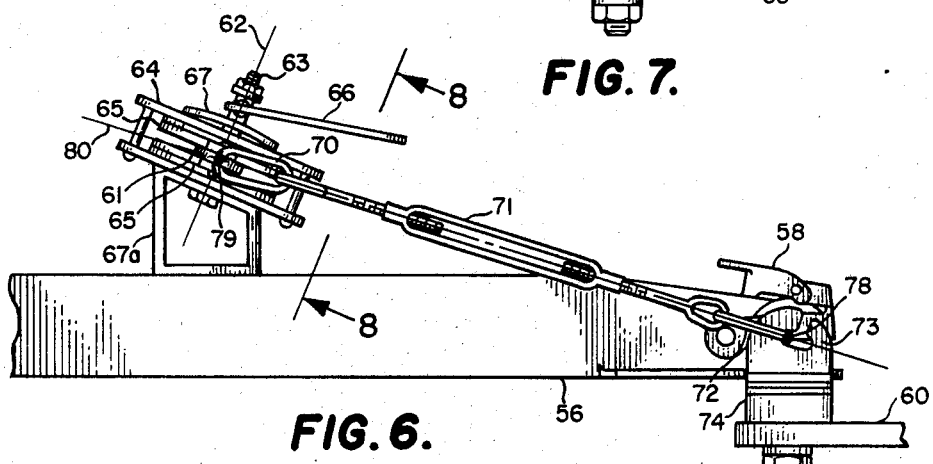
FIG. 6 is a side elevational view of the mechanism shown in FIG. 5.
Figure 8:
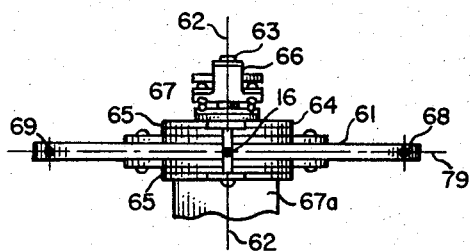
FIG. 8 is a sectional view taken from the line 8—8 of FIG. 6.

Reference is now made to a modification of the invention, as disclosed in FIGS. 5 to 8, inclusive, of the drawings.

As an example of one embodiment of this invention, there is shown a trailer hitch tongue 56 having the usual hitch socket 57 and releasable clamp 58 for demountably engaging the usual hitch ball 59 fixed to the frame 60 of the towing vehicle.

A swivel yoke 61 is pivotally mounted to swing at a point intermediate its ends about the axis 62 of the pivot bolt 63 of the friction clutch 64 having clutch plates 65 suitably engaging and frictionally engaging the top and bottom faces of the swivel yoke 61 to frictionally restrain the pivotal movement of the swivel yoke about the axis 62. A suitable clamp 66 cooperating with adjustable jamb nut 67 to regulate the frictional restraint of the clutch 64. The clutch 64 and bolt 63 are suitably fixed in operative position on a bracket 67a fixed to the tongue 56.

The other ends of the swivel yoke are provided with attachment holes 68 and 69 in which are carried links 70 to which are attached suitable tension members such as the turnbuckles 71 have one end connected to the links 70 and their other ends connected to links 72 which in turn are received in hooks 73 formed in the outer ends a mounting plate 79 rigidly fixed to the frame 60 of the towing vehicle.

It is important to note that points of engagement 75 and 76 of the links 72 with the hooks 73 lie on a transverse horizontal axis 78 through the center 77 of the hitch ball 59, and in which the distances 75–77 and 76–77 along the axis 78 are equal. Further, the points of connection 68 and 69 of the links 70 within outer ends of the swivel yoke 61 lie on a horizontal transverse axis 79 passing through the axis 62 of pivotal movement of the yoke 61 and the plate 80 defined by the axes 81 and 82 of tension action of the turnbuckles 71. The axes 78 and 79 are parallel and the axes 81 and 82 are parallel with the distances 62–68, 62–69, 75–77 and 76–77, all being equal. In this way a parallelogram linkage system 68–75, 75–76, 76–69, and 69–68 is provided for the trailer hitch system.

In accordance with the present invention and in accordance with the invention as disclosed in FIGS. 1 to 4 of the drawings, and the modified invention, as shown in FIGS. 5 to 8 of the drawings, the combined functions of damping, substitution for the usual safety chain, and the trailer tongue hold down function are all accomplished by both species of the invention. The species shown in FIGS. 1 to 4 of the drawings, as hereinbefore described, provides for a quick release mechanism for releasing the clutch mechanism forwardly to slacken the parallel linkage of the invention for disconnection thereof relative to the towing vehicles. The parallel linkage in the structure shown in FIGS. 1 to 4 of the drawings, constitutes the links 50 in connection with the arm 47 and the connection of the opposite ends of the linkage 50 with the eyes 52 on the respective mounting plate. Likewise, the modified structures includes parallel linkage comprising a pair of links 71 connected to a yoke or cross bar 79 associated with the friction clutch mechanism of the invention, and the forward ends of the parallel links 71 are connected to hook portions 27 which are upstanding portions of the mounting plate 74 which is also held in connection with the structure 60 of the towing vehicle by means of the trailer hitch ball mechanism 59. However, the mounting plate 74 may be secured to the structure 60 by additional means, such as other bolts or welding to maintain the mounting plate 74 against pivotal movement relative to the structure 60 which is generally connected to the frame of the towing vehicle.

It will be understood that all the parallel linkages of the invention extend preferably in a rearward and upward direction to their connection portions with the damping clutch mechanism of the invention, and this imposes a downward force on the trailer tongue 56 to hold its hitch socket mechanism 58 downward on the trailer hitch ball 59. The parallel links also serving to replace the conventional safety chains, and thus the parallel linkage of the invention, together with the damping mechanism, serves three important functions, as hereinbefore described, which takes care of sway control, safety chain operation, as well as imposing a downward force insuring a hold down for the trailer hitch socket mechanism on the usual ball carried by the towing vehicle.

It is to be understood that where references are made to specific areas, such as hitch ball, hitch socket, etc., that such description is to be generally accepted as the connecting means between the trailer and the towing vehicle and not necessarily limited to a single ball and socket conventional hitch connection.

It will be obvious to those skilled in the art that various modifications may be resorted to without departing from the spirit of the invention.

I claim:

1. A sway control for a trailer comprising;
   (A) a trailer hitch adapted to be fixed to the front of a vehicle to be towed;
   (B) a trailer tongue for said vehicle to be towed, said trailer tongue having a hitch socket fixed to the front portion thereof;
   (C) a hitch ball adapted to be fixed to a towing vehicle and arranged to demountably receive said hitch socket thereover;
   (D) a sway control unit mounted on said tongue, pivotally operational, and releasably secured to swing about a horizontal transverse axis therein to loosen the tension of the operating elements thereof so that they may be disconnected from the towing vehicle;
   (E) a sway control element in said mounted sway control unit pivotally operational to swing about a vertical axis relative to said operating elements under suitable restraint;
   (F) a pair of laterally spaced operating elements located at opposite sides of said sway control unit, said operating elements interconnected between said sway control element and said towing vehicle;
   (G) and a pair of pivotal connecting means attached to said towing vehicle for demountably interconnecting said operating elements to said pivotal connecting means on said towing vehicle.

2. A sway control for a trailer as in claim 1 wherein latch means is provided for securing said sway control unit with the axis of vertical swinging of its sway control element in vertical position and releasable to allow forward swinging of said sway control unit to a horizontal longitudinally disposed position of said axis of swinging of said sway control element to release tension in said operating cables to facilitate disconnecting said operating elements from the towing vehicle.

3. A sway control for a trailer as in claim 1 wherein said sway control element comprises a swivel yoke and friction restraint means mounted between said trailer and said towing vehicle to restrain free pivotal swinging about said vertical axis and including means for attaching the rearward ends of said operating cables to the periphery of said swivel yoke.

4. A sway control for a trailer as in claim 1 wherein said sway control unit is located radially offset rearwardly of the axis of pivoting of said hitch ball and socket, said laterally spaced operating elements having adjustable means for lengthening or shortening said operating elements.

5. A trailer control apparatus comprising, in combination:
   (A) a trailer hitch tongue;
   (B) a demountable hitch ball connection adapted to be fixed to a towing vehicle;
   (C) a swivel yoke pivotally mounted on said tongue to swing about a generally vertical axis, said yoke having a pair of first connection means spaced at opposite sides of said vertical axis;
   (D) yieldingly restrained clutch means operable about said vertical axis and operably connected between said towing vehicle and said swivel yoke to restrain relative pivotal movement of said yoke;
   (E) a pair of second connection means adapted to be fixed to a towing vehicle and spaced from each side of said hitch ball;
   (F) a pair of substantially parallel operating members connected between respective first and second connection means to form a linkage between said yoke and said towing vehicle.

6. The invention, as defined in claim 5, wherein: said friction clutch means and said yoke are located in elevated position relative to said tongue and said hitch ball, and wherein said operating members are disposed on an inclined angle upwardly and rearwardly from their connection with said towing vehicle to their connection with said yoke to provide for downward force on said tongue to maintain said socket on said ball in accordance with tension in said operating members.

7. A trailer hitch sway control apparatus, as defined in claim 5, wherein: said operating members are parallel and are in substantial alignment with the center of said hitch ball.

8. The invention, as defined in claim 7, wherein: said second connection means are substantially aligned with the axis of said trailer hitch ball on a horizontal plane and the first connection means at the ends of said yoke lie on a lateral axis parallel with said first mentioned axis and through the axis of the pivotal mounting of said yoke on said mounting bracket on said tongue.

9. The invention, as defined in claim 7, wherein: said second connection means lie on a horizontal axis passing through the center of said hitch ball and the first connection means on said yoke lie on a parallel axis passing through the axis of the pivotal connection of said yoke on said tongue, and said operating members are of substantially equal length and the lateral spacing of their ends from the center of the hitch ball and the axis of the pivotal mounting of the yoke are substantially equal, thus forming an operational parallelogram linkage.

10. The invention, as set forth in claim 5, wherein: a mounting plate is disposed to carry said hitch ball and said second connection, means, said mounting plate being adapted for rigid connection to the towing vehicle to prevent relative movement of said mounting plate to said towing vehicle.

11. The invention, as defined in claim 5, wherein: a mounting bracket is adapted rigidly to be connected to said tongue of said trailer for mounting said friction clutch means thereon.

12. The invention, as defined in claim 11, wherein: said yoke comprises a center portion forming a brake friction plate; and friction plate means carried by said mounting bracket cooperable therewith.

13. The invention, as defined in claim 5, wherein: said operating means are provided with adjustable structures adapted to lengthen or shorten operating members in order to apply proper tension between said first and second connection means.

14. The invention, as defined in claim 1, wherein: said center portion of said yoke and said friction plate means are provided with adjustable tension means to control the amount of friction restraint desired between said trailer and said towing vehicle.

15. A sway control for trailer hitches comprising;
(A) a trailer hitch adapted to be fixed to the front of a vehicle to be towed;
(B) a trailer tongue for said vehicle to be towed, said trailer tongue having a hitch socket fixed to the front portion thereof;
(C) a hitch ball adapted to be fixed to a towing vehicle and arranged to demountably receive said hitch socket thereover;
(D) a sway control unit mounted on said tongue, said sway control unit having damping means;
(E) a pair of spaced apart operating elements connected to said damping means;
(F) said pair of operating elements located at opposite sides of said sway control unit, said operating elements interconnected between said damping means and said towing vehicle;
(G) a mounting plate adapted to be fixed to a towing vehicle, said hitch ball connected to said mounting plate, and a pair of connection elements on said mounting plate to which said operating elements are connected, whereby an element of safety is provided, wherein the outer portions of said mounting plate are cooperative with said operating elements to retain said trailer tongue within its operating limits should said hitch ball connection become disconnected while said towing vehicle is pulling said trailer.

16. The invention, as defined in claim 15, wherein: said connection elements are substantially in alignment with the pivotal axis of said hitch ball.

References Cited

UNITED STATES PATENTS

| 2,612,382 | 9/1952 | Landis | 280—456 |
| 3,273,911 | 9/1966 | Waldie | 280—446 |
| 3,338,595 | 8/1967 | Bogie | 280—446 |
| 3,362,727 | 1/1968 | Malherbe | 220—446 |

FOREIGN PATENTS

| 517,003 | 2/1953 | Belgium. |
| 648,623 | 8/1937 | Germany. |

LEO FRIAGLIA, Primary Examiner

U.S. Cl. X.R.
280—432, 457